US010661148B2

(12) United States Patent
Huang

(10) Patent No.: US 10,661,148 B2
(45) Date of Patent: May 26, 2020

(54) DUAL MOTION SENSOR BANDS FOR REAL TIME GESTURE TRACKING AND INTERACTIVE GAMING

(71) Applicant: Rosa Mei-Mei Huang, Raleigh, NC (US)

(72) Inventor: Rosa Mei-Mei Huang, Raleigh, NC (US)

( * ) Notice: Subject to any disclaimer, the term of this patent is extended or adjusted under 35 U.S.C. 154(b) by 192 days.

(21) Appl. No.: 15/712,183

(22) Filed: Sep. 22, 2017

(65) Prior Publication Data

US 2019/0091544 A1  Mar. 28, 2019

(51) Int. Cl.
| | |
|---|---|
| *A63B 71/06* | (2006.01) |
| *A63F 13/211* | (2014.01) |
| *A63F 13/327* | (2014.01) |
| *A63F 13/25* | (2014.01) |
| *A63F 13/213* | (2014.01) |
| *A63F 13/40* | (2014.01) |
| *A63B 21/072* | (2006.01) |
| *A63B 24/00* | (2006.01) |
| *G09B 19/00* | (2006.01) |
| *G06K 9/00* | (2006.01) |

(Continued)

(52) U.S. Cl.
CPC ...... *A63B 71/0622* (2013.01); *A63B 21/0724* (2013.01); *A63B 21/0726* (2013.01); *A63B 24/0003* (2013.01); *A63B 24/0059* (2013.01); *A63B 24/0062* (2013.01); *A63B 24/0087* (2013.01); *A63F 13/211* (2014.09); *A63F 13/212* (2014.09); *A63F 13/213* (2014.09); *A63F 13/25* (2014.09); *A63F 13/327* (2014.09); *A63F 13/40* (2014.09); *A63F 13/42* (2014.09); *G06K 9/00342* (2013.01); *G09B 19/0015* (2013.01); *G09B 19/0038* (2013.01); *A63B 2024/0096* (2013.01); *A63B 2071/0625* (2013.01); *A63B 2071/0655* (2013.01); *A63B 2220/40* (2013.01); *A63B 2220/803* (2013.01); *A63B 2220/806* (2013.01); *A63B 2220/836* (2013.01); *A63B 2225/50* (2013.01)

(58) Field of Classification Search
CPC ...... A63F 13/211; A63F 13/213; A63F 13/25; A63F 13/327; A63F 13/40; A63B 21/0724; A63B 21/0726; A63B 24/0003; A63B 24/0059; A63B 24/0062; A63B 24/0087; A63B 71/0622; G06K 9/00342; G09B 19/0015; G09B 19/0038
See application file for complete search history.

(56) References Cited

U.S. PATENT DOCUMENTS

| | | | |
|---|---|---|---|
| 2014/0011555 A1* | 1/2014 | McGhee | A63F 13/212 463/7 |
| 2016/0256082 A1* | 9/2016 | Ely | A61B 5/0024 |
| 2017/0076619 A1* | 3/2017 | Wallach | G09B 19/0038 |

* cited by examiner

Primary Examiner — William H McCulloch, Jr.
Assistant Examiner — Ankit B Doshi
(74) *Attorney, Agent, or Firm* — John L. Sotomayor

(57) ABSTRACT

A method and system for recognizing complex patterns of motion and gesturing is disclosed. In one embodiment of the invention a pair of wrist (or ankle) bands senses motion which is analyzed to determine user movements in sagittal, frontal, and transverse planes. An optional front facing camera may be used to augment the data stream collected by motion sensing bands worn by the user. Games and training applications used in conjunction with the motion sensing system provide appropriate feedback, incentives, and scoring to the user via visual, audible, and haptic mechanisms.

17 Claims, 14 Drawing Sheets

(51) Int. Cl.
*A63F 13/42* (2014.01)
*A63F 13/212* (2014.01)

ANGULAR DISPLACEMENT BASED TRIGGER

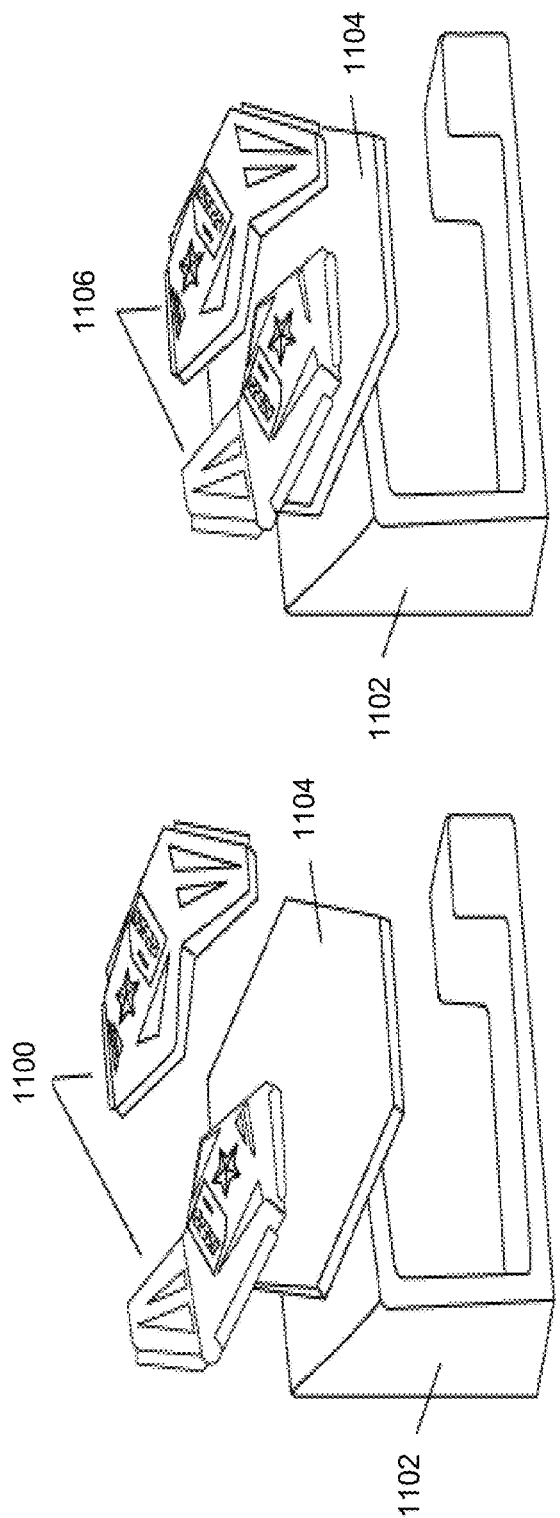
FIGURE 11A
FIGURE 11B
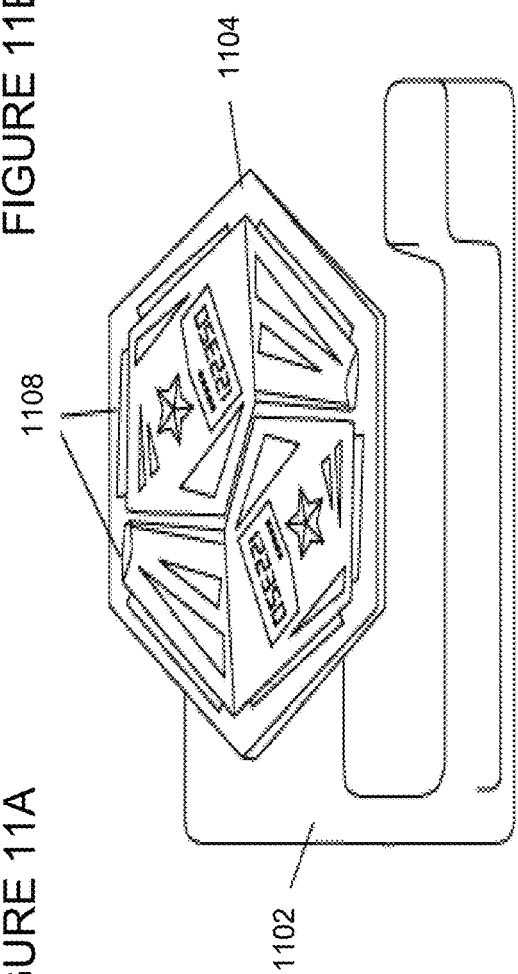
FIGURE 11C

DUAL MOTION SENSOR BANDS FOR REAL TIME GESTURE TRACKING AND INTERACTIVE GAMING

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

Currently fitness trackers on the market (Fitbit, Garmin, Moov, Mizfit and smart watches) track activities such as distance, heart rate, pulse, and all activities that are monitored primarily through use of a location tracker, heart monitor, gyroscope, and accelerometer. They are used as single units to be worn on one wrist to sense parameters to be collected, collect the data, and transmit this information to a system server upon establishing communication with the server.

Most people don't enjoy exercise. The primary issue being that the participant feels that exercise is boring or too time consuming. Kids and teenagers are averaging 8-11 hours of screen time daily, often in lieu of physical activity. Less than 5% of adults participate in 30 minutes of physical activity each day. 52% of baby boomers report no physical activity at all. These astounding statistics provide the realization that people are not enjoying exercise.

In contrast, more than 700 million people play online games, most for more than an hour a day. The average young person racks up over 10,000 hours of gaming by the age of 21. It is almost inversely proportional to how unenthusiastic people are about exercise. Most current systems utilized for online game play do not provide an avenue for exercising while actively engaged in a video game.

BRIEF SUMMARY OF THE INVENTION

It is an object of the present invention to sense body motion using paired devices worn by a user such that advanced patterns of motion and gesturing can be recognized.

It is a further object of the present invention to sense motion using inputs from a combination of motion sensing bands worn by a user and motion data captured by a front facing camera.

It is a further object of the present invention to sense and analyze movement with six degrees of freedom, including motion along the sagittal, frontal, and transverse planes of the body.

It is a further object of the present invention to provide game and fitness activities that incorporate the complicated user movements reported by the motion sensing system.

It is a further object of the present invention to provide various forms of visual, audible, and haptic feedback to a user of the motion sensing system.

It is a further object of the present invention to provide multiple communication paths to exchange information bidirectionally between the motion sensing system and supporting infrastructure, such as a system server, game server, or other gaming system.

To overcome the foregoing and additional limitations of the prior art, the present invention teaches methods and systems for creating real time gesture and movement pattern recognition using multiple devices and data streams. Motion sensing bands, when used in pairs, such as, in one non-limiting example, placing a band on the left wrist and one on the right wrist and/or on the left and right ankle, permit near field communications between the bands and the streaming of information gathered from gyroscopic sensors, accelerometer sensors, and possibly additional sensors that are incorporated into the bands. The communication between bands and information streaming by the bands may work in conjunction with sensor input from a front facing camera of a mobile device, web cam, or an external beacon to track complex human movements occurring in 3 dimensions (the sagittal, frontal and transverse planes). Although information from a camera is not required for the operation of the sensors or the information streaming from the sensor bands, such video information may be used to enhance the sensor data collected by the sensor bands.

Application software may provide training guides and instructions to help a user learn one or more specific dance, martial arts, fitness training, gymnastics or rehabilitation moves by monitoring user movements and by providing feedback via visual, audible, and haptic mechanisms to reward or correct movements during the training process.

The above as well as additional objectives, features, and advantages of the present invention will become apparent in the following detailed written description.

BRIEF DESCRIPTION OF THE DRAWINGS

Certain exemplary embodiments illustrating organization and method of operation, together with objects and advantages may be best understood by reference to the detailed description that follows taken in conjunction with the accompanying drawings in which:

FIG. 11A illustrates a view of a pair of motion capture bands separate from a recharging station consistent with certain embodiments of the present invention.

FIG. 11B illustrates a view of a pair of motion capture bands being positioned upon a recharging station consistent with certain embodiments of the present invention.

FIG. 11C illustrates a view of a pair of motion capture bands in contact with a recharging station during a charging action consistent with certain embodiments of the present invention.

DETAILED DESCRIPTION

Figure 1:
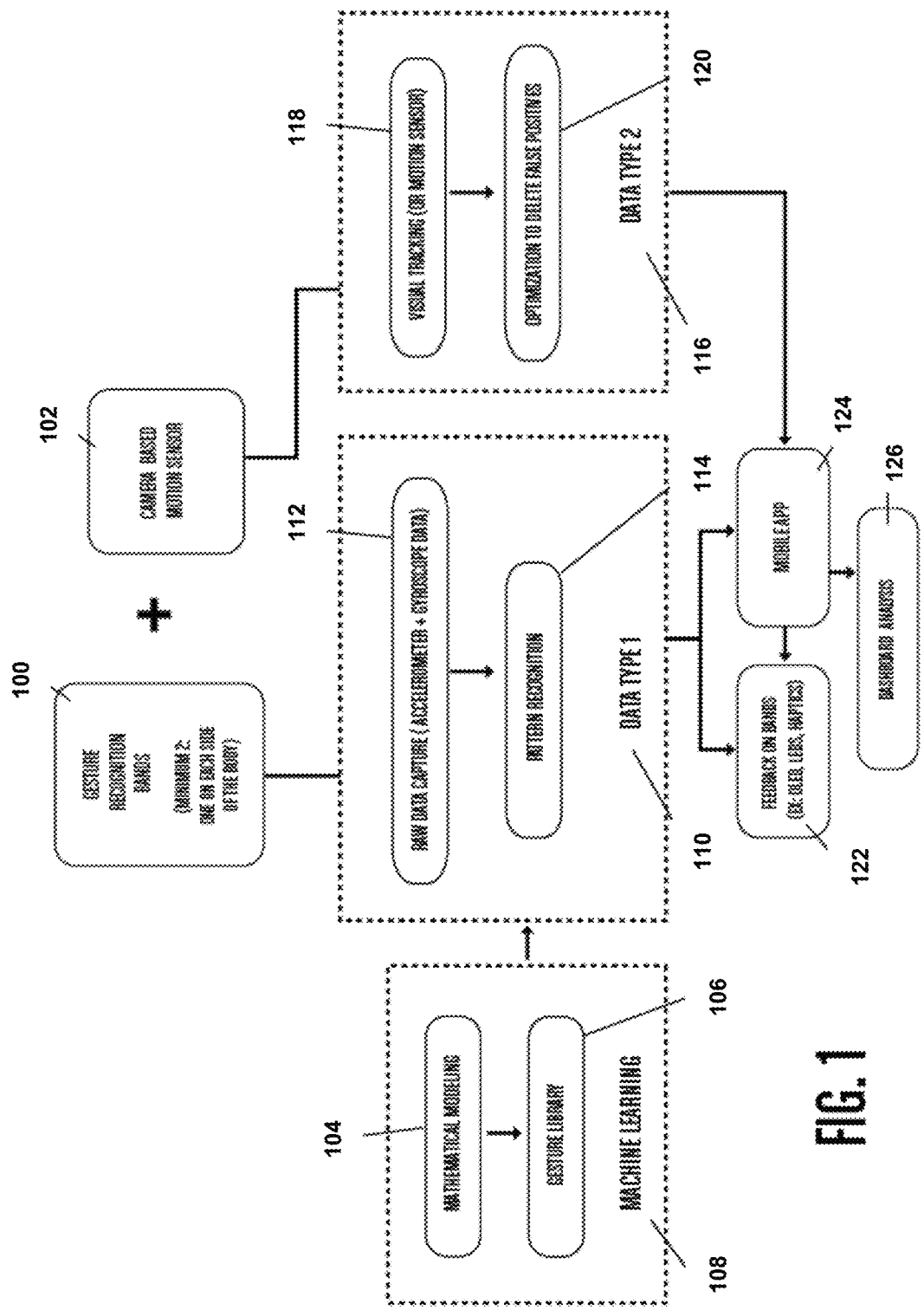
FIG. 1 shows the system design architecture for a device where motion-capture information can be obtained by gesture recognition bands consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The present invention teaches an interlocking set of motion tracking electronic sensor bands to monitor movement patterns along multiple planes, especially the sagittal plane of the body which divides left and right sides. Sets of twin motion tracking bands may support the gamification of fitness and can assist in teaching and monitoring movement skills in dance, martial arts, fitness training, gymnastics and rehabilitation, where form of the body and tracking of arm and leg movements are critical. Multiple sets of interlocking motion tracking bands, or additional configurations of motion tracking sensor bands, including configurations where motion tracking sensor bands are not strictly configured in pairs, in communication with one another and one or more system servers may also be contemplated to create the ability to accumulate and stream information from more complex movements. The motion tracking bands may be configured to communicate and share information between the sensor bands through the use of any near field communication methodology, such as Bluetooth, Bluetooth Low Energy, near field radio signals, or any other near field communication capability.

In an exemplary embodiment, the bands may feature elements which make the user aware of correct form, giving the user feedback through use of LED lights, OLED display, and advanced pulse haptic information. These elements may provide the player with feedback on game scoring, points, correct rhythm and may encourage user engagement through positive reinforcement feedback in LED light format. The motion sensing bands may work in sets of 2 to be placed on both wrists and/or both ankles, or may be configured to work in sets of paired sensing bands, such as, in a non-limiting example, two sets of two for placement on both wrists and ankles, or in greater numbers of sets to foster communication between cooperative sets of sensing bands that are affixed to multiple persons all working toward a similar movement or movement goal. Gesture recognition and analysis for 3 d human movements (sagittal, frontal, transverse) is achieved by use of one sensor each on the left and right side of the body. Through the use of gyroscope, accelerometer and a mix of raw data algorithm analysis, pattern recognition, machine learning as well as additional information optionally gathered through the front facing camera of a mobile device using a low latency optical flow algorithm, the system can understand complex motion and gesture patterns and assist players as they train to learn complex movements in dance, martial arts, gymnastics, yoga, boxing, fitness and other sports where correct form is critical to training and performance.

The motion sensing bands collect sensor data from accelerometer sensors (and possibly additional sensors) and can work in conjunction with sensor input from the front facing camera of a mobile device, web cam, or an external beacon to track complex human movements occurring in 3 dimensions (the sagittal, frontal and transverse planes). Input from a camera of a mobile device, web cam, or external beacon is not required but may be used by the system as additional data for analysis of movement. The system is able to analyze movement with six degrees of freedom. The six degrees of freedom arise from linear motion and rotational motion along each of the X, Y, and Z axis. Each axis is perpendicular to one of three planes:

Sagittal place—divides the body into two roughly equal-sized portions and separates left side from right side; user motion within the plane is forward or backward.

Frontal plane—divides the body into two roughly equal-sized portions and separates front from back; user motion within the plane is to the left or to the right.

Transverse plane—divides the body into two roughly equal-sized portions at roughly hip level and separates top from bottom; user motion is rotational—turning to the left or turning to the right.

It is understood in the art that all functional movements are three dimensional and that generalized gross movement patterns can be biomechanically understood by describing them in terms of single planes. In an additional embodiment, motion data captured from more than one set of sensing bands may be analyzed and utilized to assist more than one user to simultaneously synchronize movements in any or all of the sagittal, frontal, or transverse planes. This synchronization may present a user with additional analysis in relation to another user or object, and may present a group of users with feedback on physical movements to provide for analysis and improvement on individual movement, or on movements that depend upon group interaction and placement.

The motion data gathered from these various input devices reveal a plurality of metrics which can analyze and determine the direction and level of the movement, the part of the body performing the movement, the duration of movement, and dynamic qualities of the movement. This information may be used to create a scoring mechanism to incentivize fitness activities. All of the data gathered may be captured and analyzed in real time and may enable skeletal tracking of human body movement without the use of infrared devices. The unified gesture and pattern recognition occurs as a result of data input from pairs or other groupings of wristbands and/or ankle bands, as well as input from the from facing camera of one or more user mobile devices.

Using just the motion sensing bands in pairs or other configurations, users will be able to enjoy motion sensing game play that formerly used to be only possible through skeletal tracking of the body with infrared cameras or similar devices. The bands will allow for single or multiplayer options and the user is not confined to staying in view and range of a camera device.

In some embodiments an infrastructure may support the collection and analysis of motion data from the bands and optional front facing camera, the selection of a gaming, training, educational, or other application, analysis of the motion data, communication of feedback to the user, presentation of gaming, instructional, training, or other audio/visual displays, collection of statistical, progress, scoring, and other data, and other tasks as will be defined in the following descriptions and figures. The infrastructure for certain embodiments may include the user's smart phone, set-top box, gaming system or other similar device, downloadable applications, front facing cameras, cloud network services, and other elements as described herein.

In some embodiments the system may provide communication into and out of the motion sensing bands using one or more communication channels such as Near Field Communication (NFC), Bluetooth, WiFi, cellular telephone links, infrared beaming, and so on. These communication channels may be used to collect information from the motion sensing bands or to download information or software into the motion sensing bands. For example, in some embodiments the links may be used to collect motion and gesture data, button or touch inputs, speech, environmental metrics, or input from other components that may be a standard or optional part of the motion sensing bands. In some embodiments, the communication channels may be used to send data such as personalization to the motion sensing bands, to send signals that activate LEDs, OLED displays, haptic responses, sound transducers, and other feedback devices, or to download new programs into the memory of the motion sensing bands.

In certain embodiments, downloaded programs may be used to correct software defects, add new features, or to provide special modes of operation such as a 'concert mode'. In some embodiments of the present invention, concert organizers may, with the permission of the owner, download special software applications that enhance the concert-going experience of attendees who are wearing the motion sensing bands. Non-limiting examples of 'concert mode' functions may include assisting with ticketing and admission, providing special lighting effects during the performances by triggering motion sensing band LEDs of all attendees in unison, or measuring audience response (for example, by detecting what portion of the audience is clapping their hands over their head), and so on. In some embodiments, 'concert mode' functions may be triggered by allowing concert organizers to send messages to attendee's phones using one form of communication and then having the phones relay appropriate messages to the motion sending bands using a different or the same communication channel.

In an exemplary embodiment, sensor bands may be used in any combination, whether configured in pairs, multiple pairs, singly or in odd numbers of sensing bands, to permit a user or a group of users to become a part of an augmented reality experience. Integrating the data collected from the multiple sensor bands with one or more three dimensional holographic landscapes or scenarios may permit the user or group of users to control the environment within the augmented reality experience with gestures and motions of the extremities to which the bands are attached. In a non-limiting example, the sensor bands can enable gesture and motion driven holographic UX/UI design and implementation of augmented reality experiences, and be used to create gesture driven environments for augmented reality and virtual reality systems. These systems may be optimized for security, command and control, role playing game immersion, and educational systems, among other advances in augmented reality.

Normally the biggest drawback of any electronic device is battery charging, and charging stations and cords are just unattractive or a mess of cords. In some embodiments of the present invention, the motion sensing bands may have their internal batteries recharged by placing the bands in the vicinity of a wireless recharging device, such as one that operates according to the Wireless Power Consortium Qi® standard. In some embodiments, the faces of the motion sensing bands fit together in a sort of interlocking 'yin yang' configuration. In certain embodiments, the motion sensing bands, utilizing their unique interlocking shapes, can be joined together forming an 'oracle' which can be charged on a docking station. In some embodiments, the motion sensing bands may reduce or remove power to some internal subsystems or components when it is determined that they are not currently required for use.

In some embodiments the motion sensing bands may be capable of providing audible feedback to the wearer.

In some embodiments the haptic function provided in the motion sensing bands may involve the use of multiple microhammers so that pulse sensations of different frequencies can be delivered to the user simultaneously.

In some embodiments one or more monochromatic or color-changing LED indicators may be provided on each motion sensing band. The indicators may, for example, provide user sensory stimulus such as pinball-like flashes during gaming or may be activated during concert performances when the motion sensing bands are used in concert mode.

In an exemplary embodiment, the system may utilize an OPTICAL FLOW ALGORITHM which interprets histogramic data using the front facing camera of any mobile device. This technology was developed for use with motion sensor applications, such as, in a non-limiting example, Taichi Temple and Funky Dance, using Extreme Reality skeletal motion tracking. This system was extremely memory and CPU intensive and crashed on devices constantly. To overcome these issues, a low latency solution was developed having little or no lag time between the player image and data processing. This OPTICAL FLOW approach was able to work on ALL mobile devices without crashing, even low level devices targeted at kids.

The front facing camera is generally used for video conferencing or when a user wishes to take a picture of him or her-self. It is less often used with this type of visual tracking system which, though technically not as accurate as skeletal tracking, offers gamification options which are well suited to mobile devices. Additionally, other system uses may include health and fitness applications where the visual examination of a person may be important for feedback or diagnosis of particular issues.

This optical flow motion sensor adds extra visual tracking information about the wearer's movement using any device. Theoretically the system can also work with just this mobile device motion tracking system, although the dual bands provide enhanced game play and enhanced collection of sensor data for use in health monitoring, sports training, or other monitoring other physical activities.

In an embodiment, the description presents a system and method for motion capture of human activity, utilizing two or more sensing bands attached to a human body. In this embodiment, each sensing band is in communication with every other sensing band and with an external processor. The sensing bands may be operative to track motion of the human body in the x, y, and z axes as well as rotational motion along a transverse plane and transmitting the captured motion to the external processor. The captured data from the sensing bands is analyzed by the external processor to create a scoring mechanism to incentivize physical activities. Upon creation of the incentivizing score, the system may transmit the results from the scoring mechanism in real time to one or more human users of the system.

In an embodiment, the data captured by the sensing bands may be analyzed by the external processor to determine direction and level of motion, the part of the human body performing the movement, duration and dynamic qualities of the movement. The sensing bands may operate in pairs, or in groups larger than two and permit the user to be a part of an augmented reality experience. The system and method provides for communication into and out of the sensing bands using one or more communication channels, such as Near Field Communication (NFC), Bluetooth, WiFi, cellular telephone links, and infrared beaming.

In an embodiment, the system and method provides for the collection and analysis of motion data from two or more sensing bands and an optional front facing camera associated with a mobile device. Additionally, the sensing bands may provide audible feedback to one or more human users. The sensing bands may also have a haptic function involving the use of multiple microhammers providing pulse sensations of different frequencies to be delivered to the user simultaneously.

In an embodiment, pairs of the motion sensing bands may fit together in an interlocking 'yin yang' configuration. Additionally, pairs of the motion sensing bands, utilizing the interlocking configuration, are joined together to be charged on a docking station simultaneously.

Turning now to FIG. 1, this figure shows the system design architecture for this device consistent with certain embodiments of the present invention wherein motion capture information can be obtained by gesture recognition bands (100). Additional motion sensor information can be obtained through visual tracking of the user using the front facing camera of the mobile device (102). In a non-limiting example of such as system, an optical flow motion tracking algorithm may analyze the histogramic data captured as a low latency tracker which does not require calibration. Various types of mathematical modeling (104) and gesture libraries (106) are incorporated into machine learning (108) used for such functions as hierarchical feature extraction and information processing. These functions are incorporated into data type 1 (110) where raw data capture (112) from an accelerometer and gyroscope is combined with pattern recognition (114). The camera based motion tracker (102) collects data type 2 (116) via visual tracking (118) and optimization to delete false positives (120). Data type 1 (110) and Data type 2 (116) are then routed to feedback on bands (122), the mobile app (124) and dashboard analysis (126).

Figure 2:
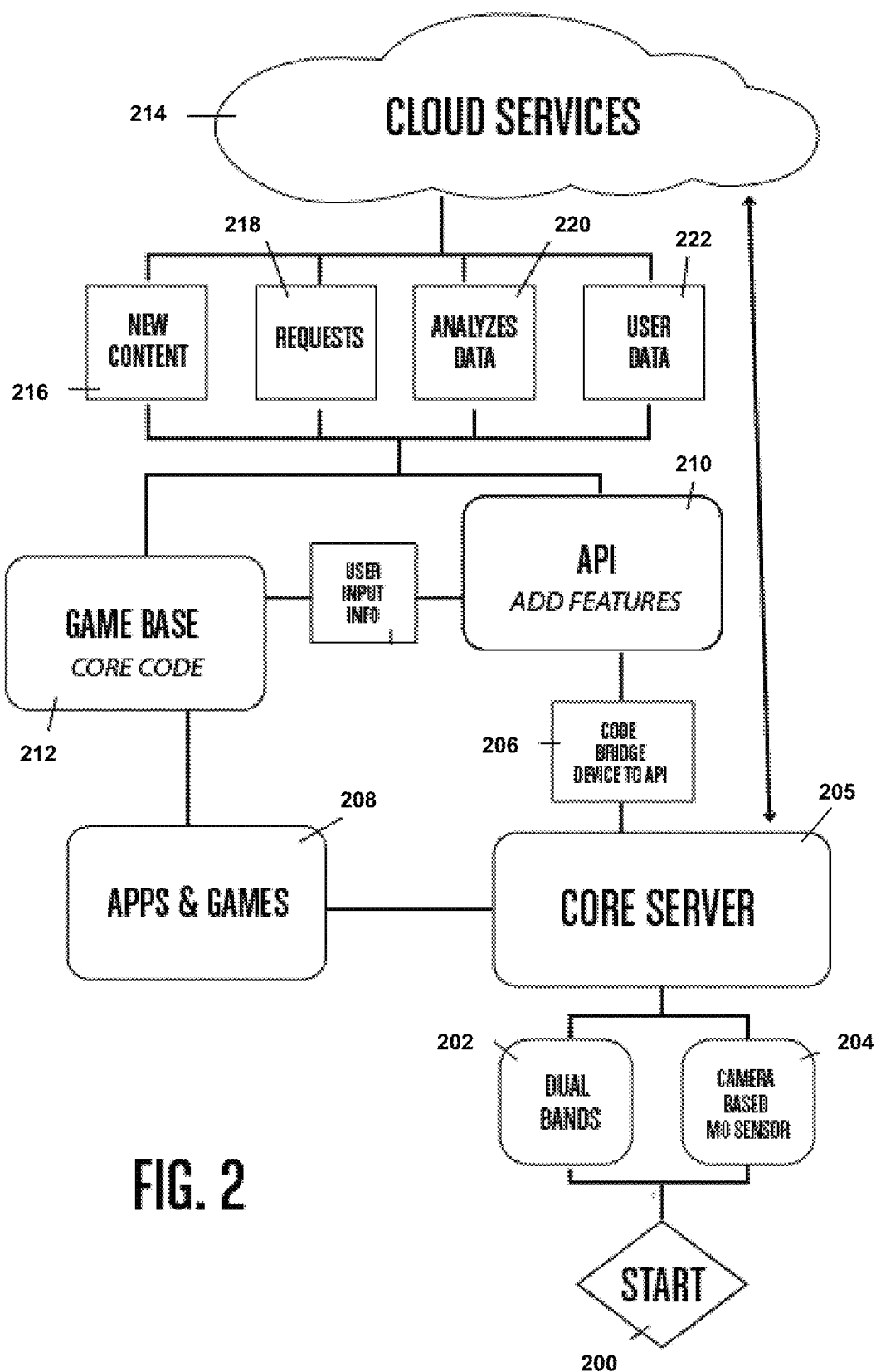
FIG. 2 shows a schematic block diagram of game play integration consistent with certain embodiments of the present invention.

Turning now to FIG. 2, this figure shows a schematic block diagram of game play integration consistent with certain embodiments of the present invention. At the start of game play (200) motion sensor information is captured via dual motion sensing bands (202) as a source of primary gesture data and a camera based motion sensor (204) in the mobile device or web cam as a secondary gesture data source based on visual tracking. The information captured by the dual motion sensing bands (202) and camera based motion sensor (204) passes to a core server. The core server (205), which provides the primary processing of the input motion and visual field data, is an engine that uses an Application Programming Interface (API) to receive data from the dual motion sensing bands. The core server (205) also communicates with the API to provide two-way data communication between the core server (205) and the dual motion sensing bands (202). The core server (205) connects to and communicates with a core bridge device to the API (206) which serves as a bridge between the code from the device and the API. The core server (205) also connects to Apps & Games (208) which can contain such items as lessons, channels, communities, etc. The Apps and Games (208) and API feature set (210) may contain features such as movement recognition, pattern recognition, heart rate, calories and accuracy tracking, as well as additional games and features that may be added as new content is created. These games and features can be added to connect to and expand the game base (212) or core code that is maintained within the core server (205). These feature sets can contain information such as game management system level information, content engine, lesson engine, progress tracking, social engine, training advisors, advertising or Independent Application Programs (IAPs).

In an embodiment, the Game Base (212) and API (210) may then route all collected and internally processed data to Cloud Services (214) for storage and interaction with utilities maintained in the Cloud. The data communicated from the system may be routed through various data content channels depending upon the type of content to be transferred to Cloud Services (214). In a non-limiting example, data content may be collected and transmitted via New Content (216), Requests (218), Data Analysis (220) and User Data (222) channels, once again, based upon the origination and classification of the data to be transferred to Cloud Services (214). The Cloud Services (214) maintains a dynamic and continuous two-way communication channel with the Core Server (205) in addition to the data communication transferred to and from the data content channels.

Figure 3A:
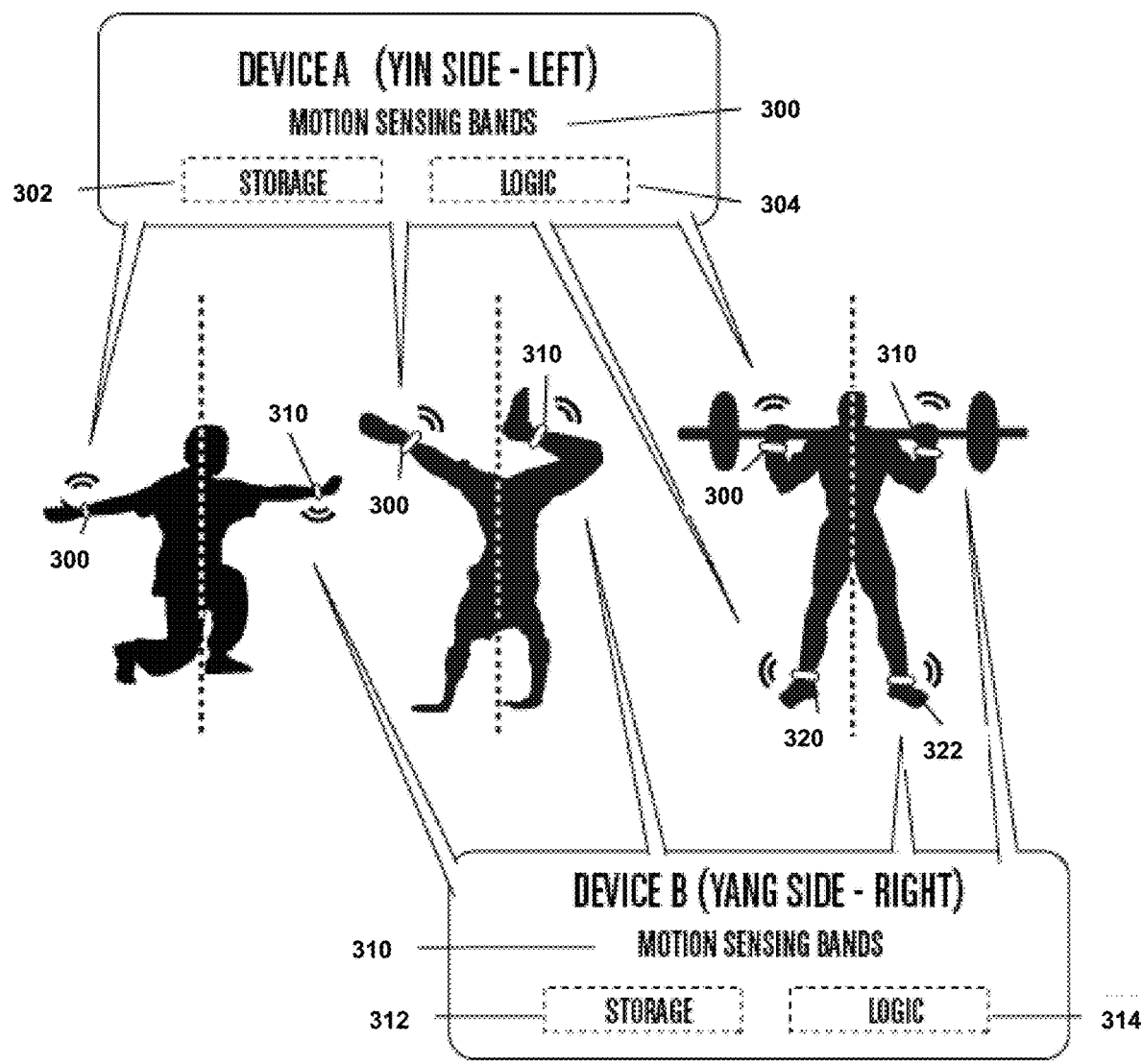
FIG. 3A illustrates the dual band devices on the player's body consistent with certain embodiments of the present invention.

Turning now to FIG. 3A, this figure illustrates the dual band devices on the player's body consistent with certain embodiments of the present invention. The motion capture bands, also known as Atomic Bands, are composed of at least a Device A (300) and a Device B (310). Device A (300) or the Yin Side is located on the left side of the body (on the left wrist or left ankle or left wrist and ankle) and contains information pertaining to storage (302) and logic (304). Device B (310) or the Yang Side is located on the right side of the body (on the right wrist or right ankle or both the right wrist and right ankle) and contains information pertaining to storage (312) and logic (314). Device A (300) and Device B (310) collect information from movement sensed on each side of the sagittal plane of the body as indicated by the dotted line.

Figure 3B:
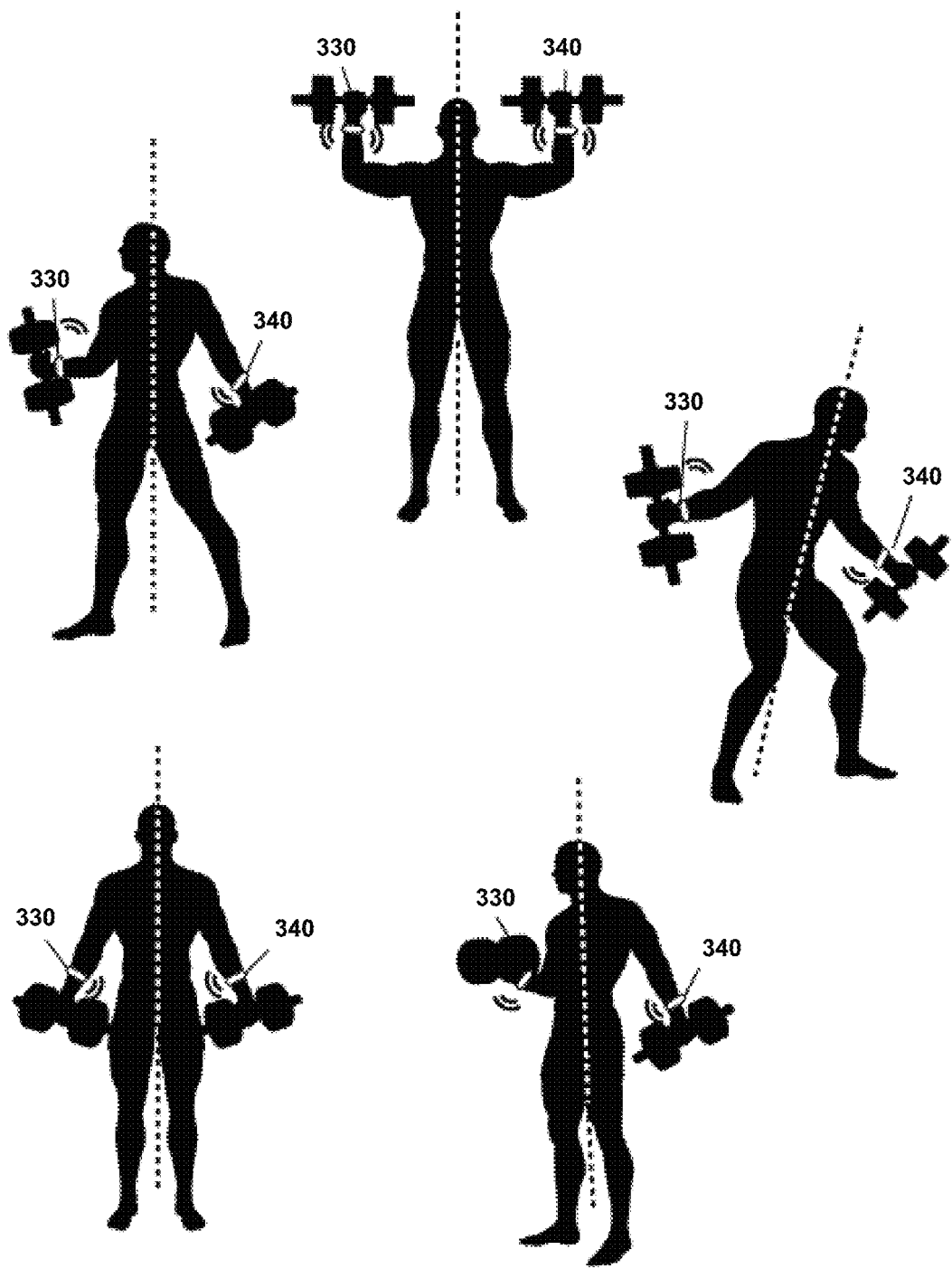
FIG. 3B illustrates dual bands as used for an activity such as fitness training consistent with certain embodiments of the present invention.

Turning now to FIG. 3B, this figure illustrates dual bands as used for an activity such as fitness training consistent with certain embodiments of the present invention where the right side device (330) communicates information with the left side device (340). The information shared between the right side device (330) and the left side device (340) provides information to each device that is relative to the position of the other device. The information communication between devices permits the devices to remain in synchronization with each other and to continually update this information as tracking information, which may also be transmitted to the system as previously described.

Figure 4:
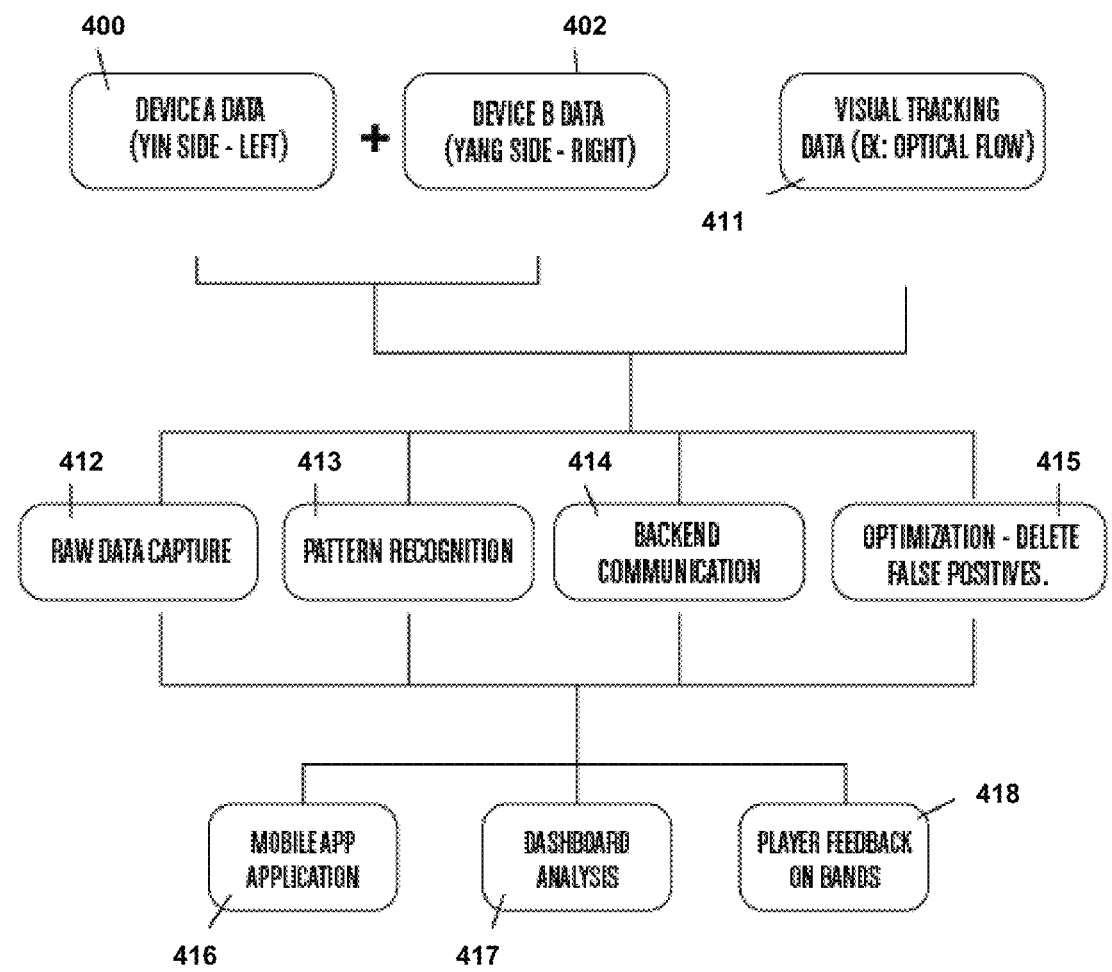
FIG. 4 is a schematic block diagram showing the use of the bands in game play consistent with certain embodiments of the present invention.

Turning now to FIG. 4, this figure is a schematic bloc diagram showing the use of the bands in game play consistent with certain embodiments of the present invention. The Device A Data (400) from the left or yin side is combined with the Device B Data (402) from the right or yang side as a form of primary gesture recognition. Visual tracking (411) which includes information such as optical flow for the front facing camera of the mobile device, provides a source of secondary gesture recognition data. Primary and secondary gesture recognition data is then processed through Raw Data Capture (412), Pattern Recognition (413), Backend Communication (414) and Optimization of False Positives (415). The data may be processed in a serial fashion in which the system receives the raw data from both devices and from a visual tracking device. The Device A Data (400), Device B Data (402) and visual tracking (411) data may then be processed by a pattern recognition (413) algorithm to determine the closest pattern that fits the movement represented by the received data. The backend communication (414) may then transmit this data to the system and to Cloud Services (not shown) for storage and/or further processing. The received and processed data may then be optimized through the deletion of false positives for certain physical patterns, and the physical pattern that is closest to the position and/or motion represented by the captured data is stored and transmitted on through the system for further use. In a non-limiting example, the processed data may then be transferred to a Mobile App Application (416) for display to a user, transferred to Dashboard Analytics (417) for accumulation and presentation of optimized physical positioning over time, and to Player Feedback on Bands (418), where the feedback may be presented to a user in forms such as Organic Light Emitting Diodes (OLEDs), Light Emitting Diodes (LEDs), and/or Haptic feedback.

Figure 5A:
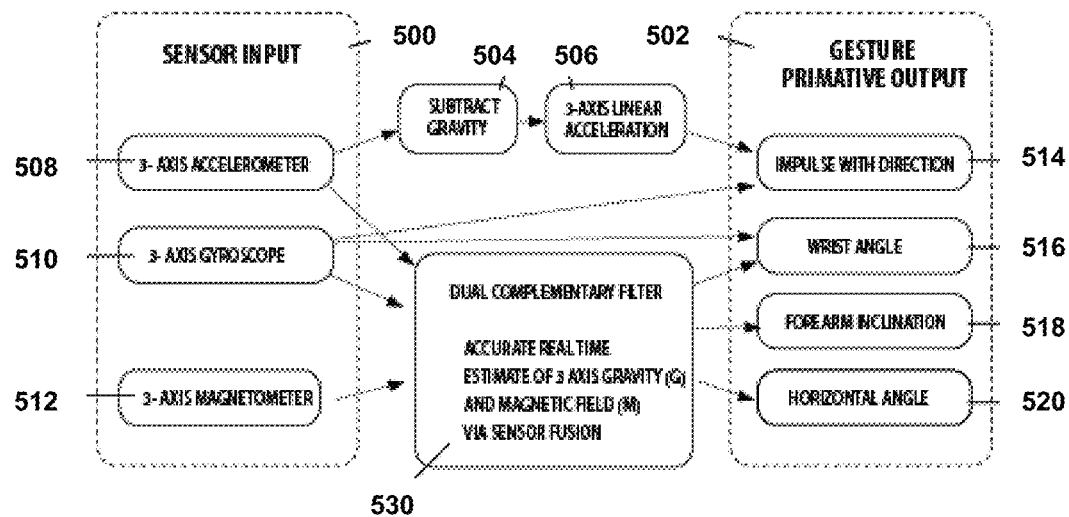
FIG. 5A is a schematic block diagram illustrating the types of sensor inputs and gesture primitive input gathered through raw data algorithm analysis consistent with certain embodiments of the present invention.

Turning now to FIG. 5A, this figure is a schematic block diagram illustrating the types of sensor inputs and gesture primitive input gathered through raw data algorithm analysis consistent with certain embodiments of the present invention In certain embodiments of the present invention, 6 or 9 axis data collection is recommended. In this system, a Sensor Input (500) consisting of a 3-axis accelerometer (508), a 3-axis gyroscope (510) and possibly a 3-axis magnetometer (512) sends information in the following manner. The accelerometer (508) sends info to Subtract Gravity (504) and 3-axis Linear Acceleration (506). All three sensor inputs (508), (510) and (512) can feed into a processor (530) consisting of a dual complementary filter and accurate real time estimate of 3 axis gravity and magnetic field via sensor fusion. Sensor input (500) and other information can be channeled into Gesture Primitive Outputs such as Impulse with Direction (514), Wrist Angle (516), Forearm Inclination (518) and Horizontal Angle (520).

Figure 5B:
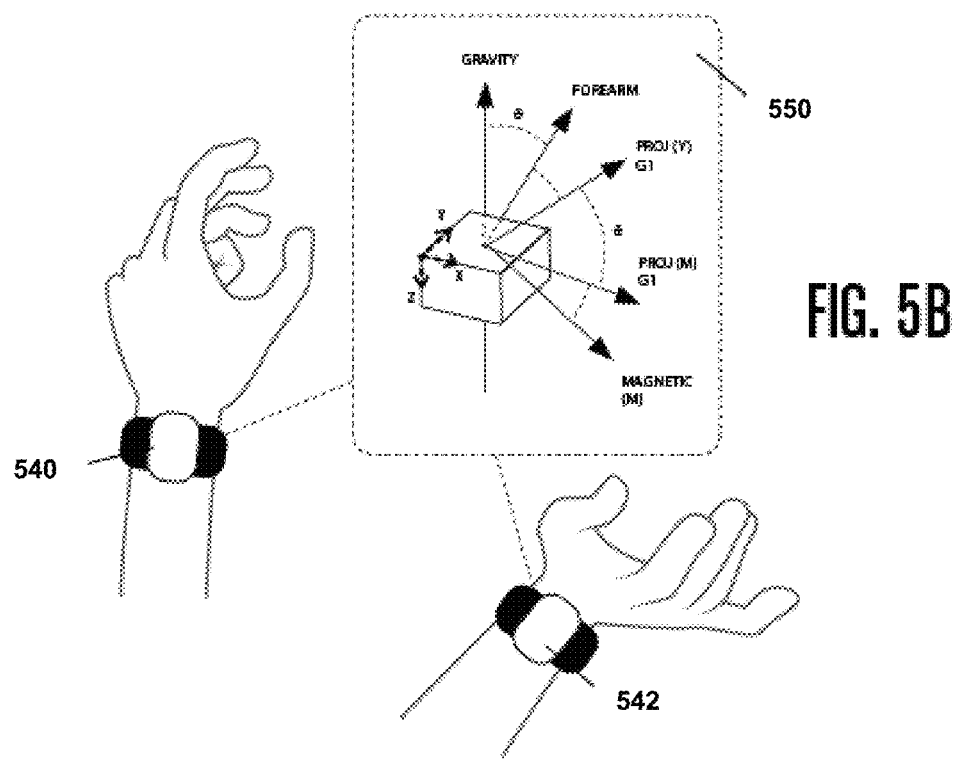
FIG. 5B illustrates primitive angles in raw data accumulation using a device consisting of Left side and Right side consistent with certain embodiments of the present invention.

Turning now to FIG. 5B, this figure illustrates primitive angles in raw data accumulation using a device consisting of Left side (540) and Right side (542) consistent with certain embodiments of the present invention. Information from these 2 linked devices can give information (550) relating to the x, y and z axis concerning gravity, location of the forearm and information related to data capture from the accelerometer, gyroscope and magnetometer.

Figure 6A:
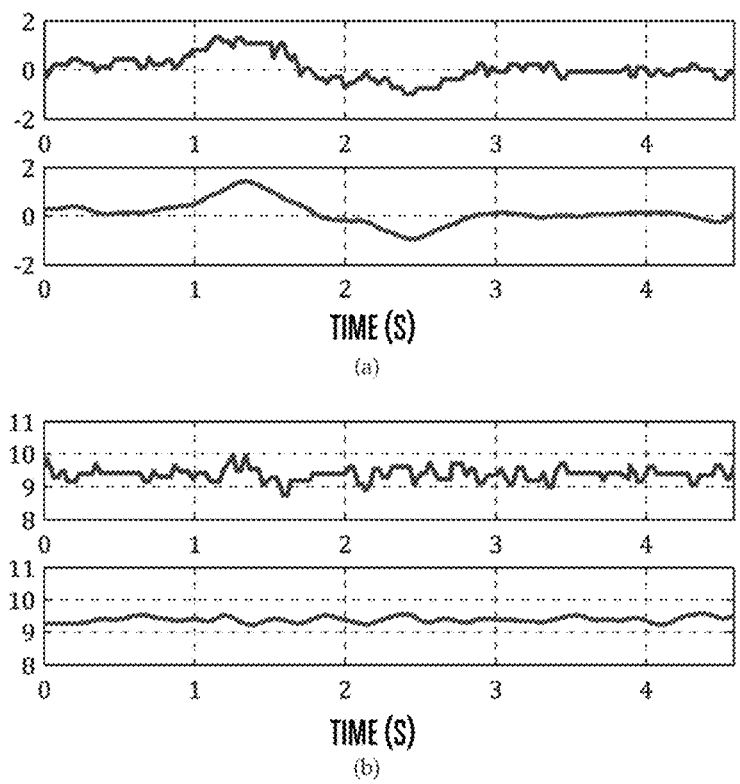
FIG. 6A shows graphs for raw vs. processed acceleration signals consistent with certain embodiments of the present invention.

Turning now to FIG. 6A, this figure shows graphs for raw vs. processed acceleration signals (in m/s2) along a) x and b) y axes defining a straight left to right line gesture consistent with certain embodiments of the present invention. The jagged line shows raw data capture (with many extraneous lines for noise which must be subtracted for proper analysis) and the smother line shows the processed acceleration signal.

Figure 6B:
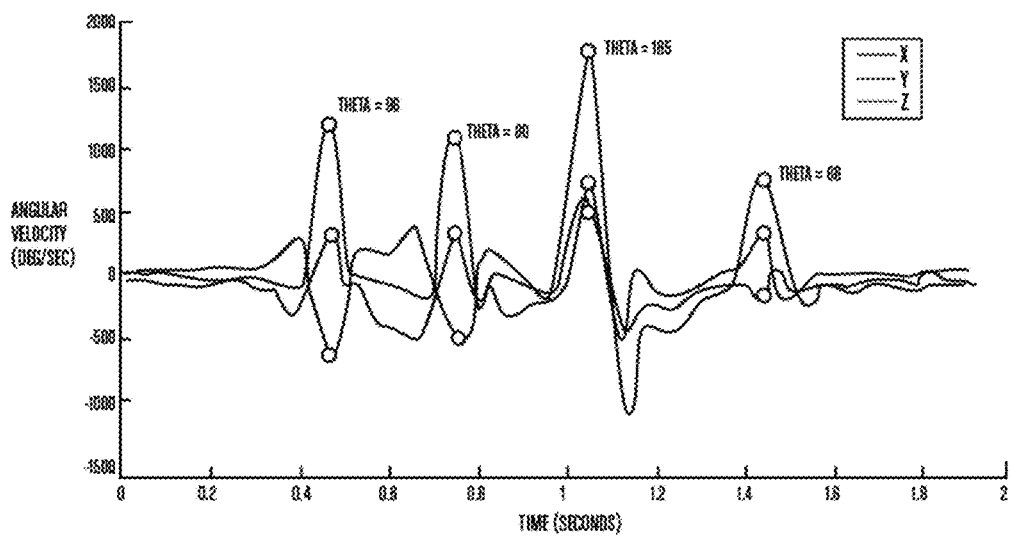
FIG. 6B illustrates Angular Displacement Based Trigger from raw data analysis consistent with certain embodiments of the present invention.

Turning now to FIG. 6B, this figure illustrates Angular Displacement Based Trigger from raw data analysis where the X, Y and Z axes register different angles (indicated by the circles and theta readings) consistent with certain embodiments of the present invention.

Figure 7A:
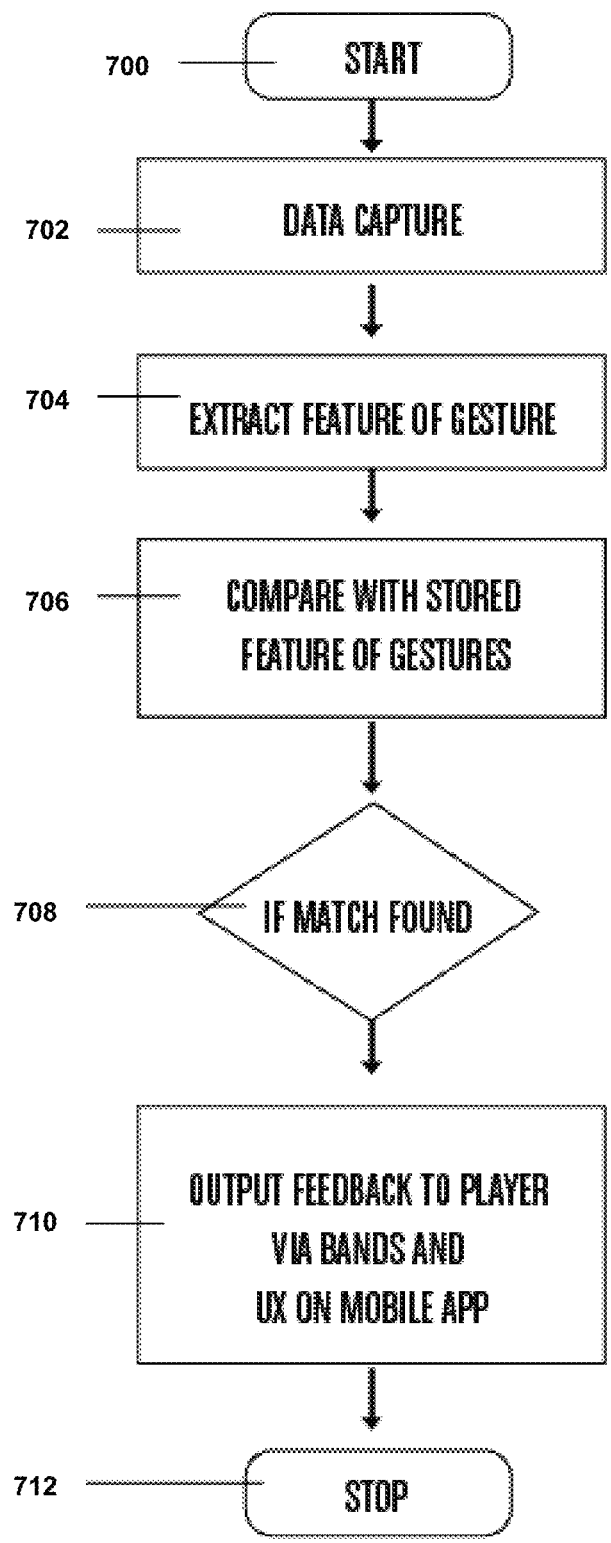
FIG. 7A illustrates the system of Basic Data Analysis for motion capture consistent with certain embodiments of the present invention.

Turning now to FIG. 7A, this figure illustrates the system of Basic Data Analysis for motion capture consistent with certain embodiments of the present invention. The Start (700) of the process proceeds with Data Capture (702). From this, the process proceeds with the Extraction of Features of Gesture (704). The system then compares the extracted features of the gestures performed by a user with a library containing Stored Feature of Gestures (706). If a Match is found (708), the system gives Output Feedback to the Player via Bands and the User eXperience (UX) on the Mobile App (710). When the process is complete the process Stops (712).

Figure 7B:
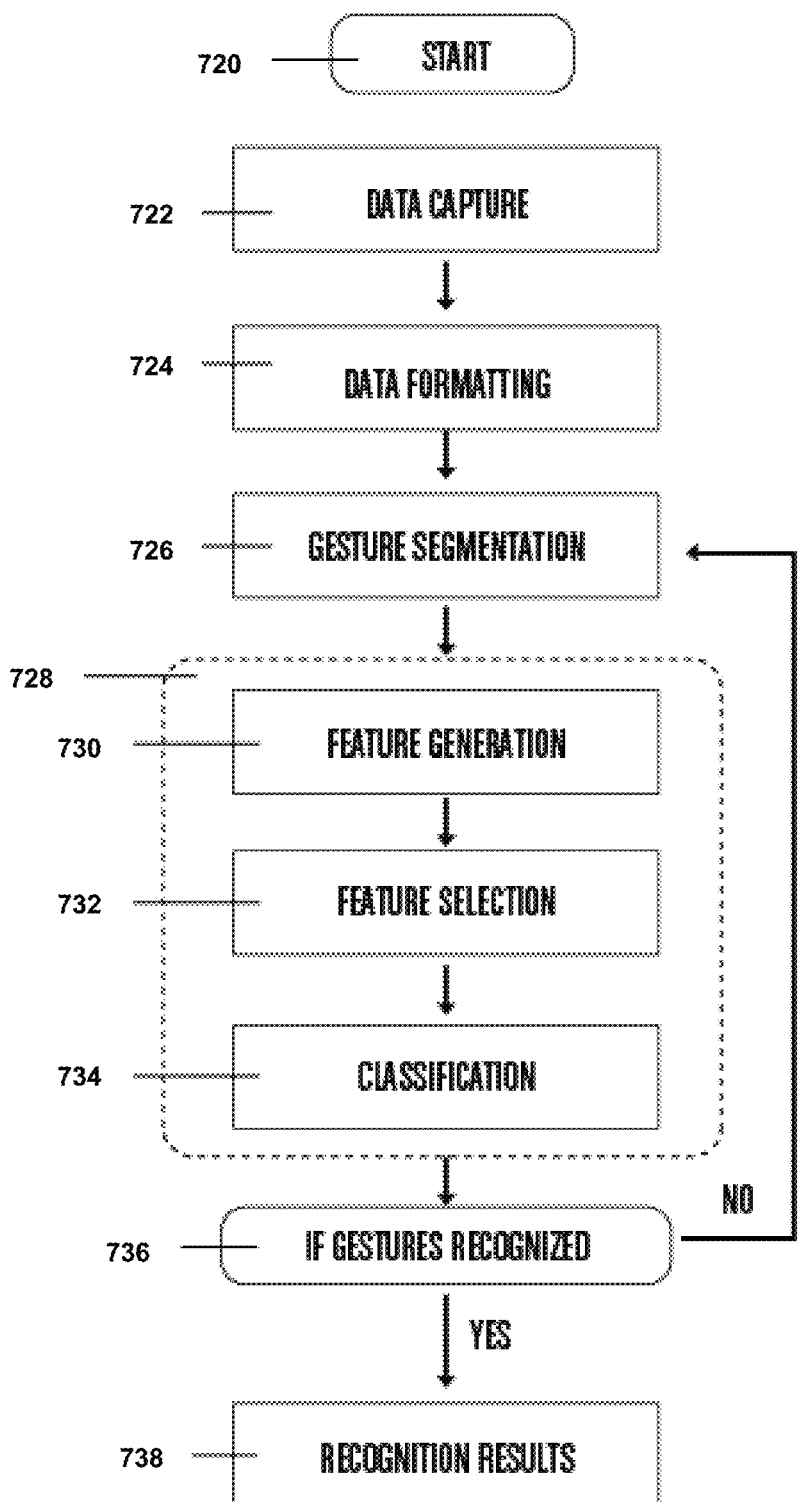
FIG. 7B is a schematic block diagram showing pattern recognition work flow consistent with certain embodiments of the present invention.

Turning now to FIG. 7B, this figure is a schematic block diagram showing pattern recognition work flow consistent with certain embodiments of the present invention. In some embodiments, after the pattern recognition process is initiated (720), the system proceeds to Data Capture (722), Data Formatting (724) and Gesture Segmentation (726). The completion of these process steps forms a type of recognition system (728) consisting of Feature Generation (730), Feature Selection (732) and Classification (734). If Gestures Are Recognized (736), the system yields Recognition Results (738). If not, then the existing set of data is resent through Gesture Segmentation (726), and the process attempts to optimize and refine the pattern to be recognized from the input data by repeating the Feature Generation (730), Feature Selection (732) and Classification (734).

Figure 8:
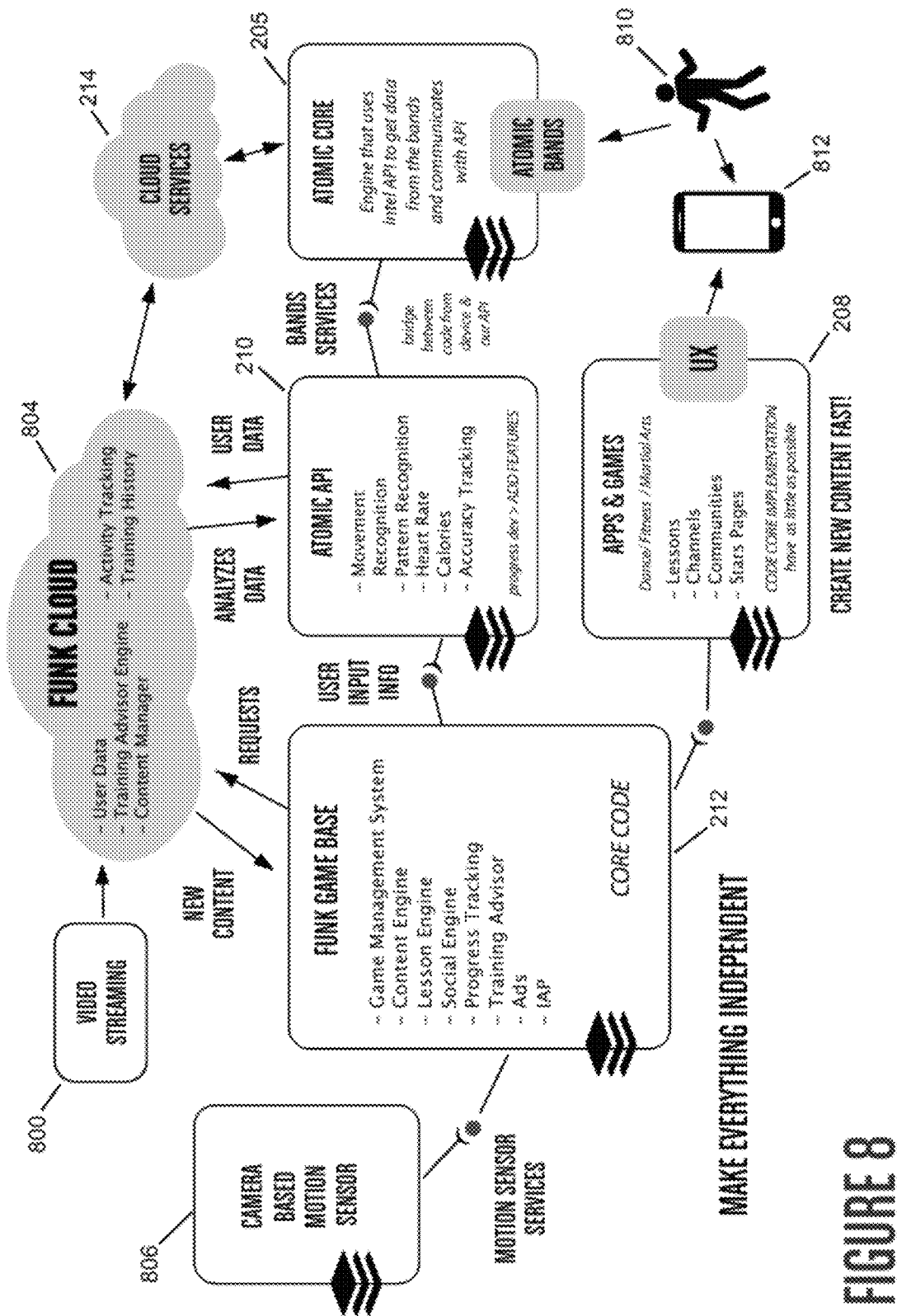
FIG. 8 illustrates an alternate view of the system architecture utilizing a cloud based, online system consistent with certain embodiments of the present invention.

Turning now to FIG. 8, this figure illustrates an alternate view of the system architecture utilizing a cloud based, online system consistent with certain embodiments of the present invention. In particular, this figure highlights that the present invention may use other sources of streaming video and may tie into other cloud services.

In an embodiment, the system architecture takes advantage wireless interconnection to streaming video (800) and Intelligent Cloud Services (214) to provide input to the cloud instantiation of the motion capture bands control system (804), which may also be known as the Atomic Bands control system. The Atomic Bands control system (804) is responsible for the capture and maintenance of user data, contains a training advisor engine to assist in training for motion and use of the Atomic Bands, provides management for all content associated with the system, and provides for activity tracking and training history information for all users (810). As previously described, the core code (212) for the Atomic Bands system provides information, management and control for all content aspects of the Atomic Bands system. The content aspects may include game management, the content and lesson engines, a social engine to permit interaction with social programs and programming, provides for tracking progress for all users, establishes training advice, and provides for advertising and other connections to the Atomic Bands control system (804). In an embodiment, additional information in the form of streaming video or other camera based motion sensor information may be communicated to the core code (212) of the Atomic Bands system. The video information may be captured by a camera based motion sensor (806) to provide video information to the system.

In an embodiment, the Atomic core (205) provides at least the functions of capturing data from the Atomic Bands and communicating the captured data to the API (210). In a non-limiting example, the Atomic Bands may be worn by a user (810) and the user's movements are captured by the Atomic Bands. The information captured by the Atomic Bands is transmitted to the API (210) which processes the input to produce at least movement recognition, pattern recognition, heart rate data, calories consumed data, and accuracy tracking for each user. This information is transmitted wirelessly to the Atomic Bands control system (804) for storage and analysis.

In an embodiment, applications and games that are designed to utilize the motion capture bands may be created and updated in the content core (208). In a non-limiting example, applications may be included to monitor motion of a user involved in Dance movement, in game movement, martial arts training, but may also include patient monitoring and gesture recognition for use with patients in medical centers or any other venue where gestures may have content associated with gestures, such as auctions or any other gesture sensitive activity. Additionally, the motion capture bands may be used with Augmented Reality (AR) and Virtual Reality (VR) systems in which motion capture data from the Atomic Bands may permit differentiation of story lines, interaction with virtual characters, and enhanced game play or enhanced gesture recognition and interaction with users wearing at least two Atomic Bands.

The user (810) may also communicate with the Atomic Bands system through a user interface (UX) in communication with a mobile device (812) associated with the user (810). The UX may also provide a user experience in combination with the gestures and motion performed by the user (810) to participate in movement oriented games or activities (such as dance, martial arts, yoga, or any other movement based activity), interface and interact with AR and/or VR experience activities, or any other tracking and motion management activity (such as patient monitoring, sports motion monitoring, etc).

Figure 9:
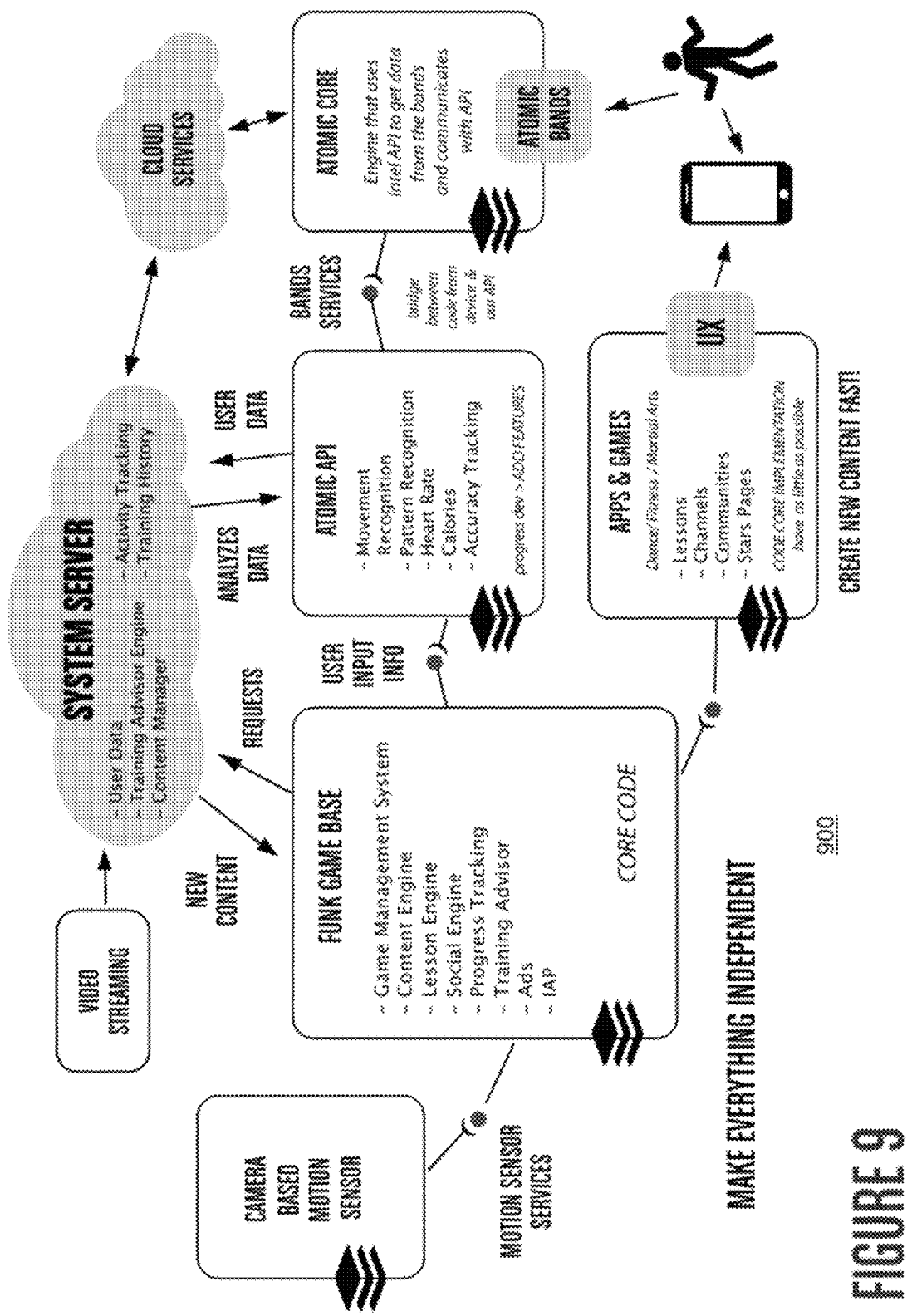
FIG. 9 illustrates an alternate view of the system architecture utilizing an off-line or local server based system consistent with certain embodiments of the present invention.

Turning now to FIG. 9, this figure illustrates an alternate view of the system architecture utilizing an off-line or local server based system consistent with certain embodiments of the present invention (900). In particular, this figure highlights that the present invention may use other sources of streaming video and may be managed through an offline server or an alternate server that is connected to a local network, or other managed network.

Figure 10B:
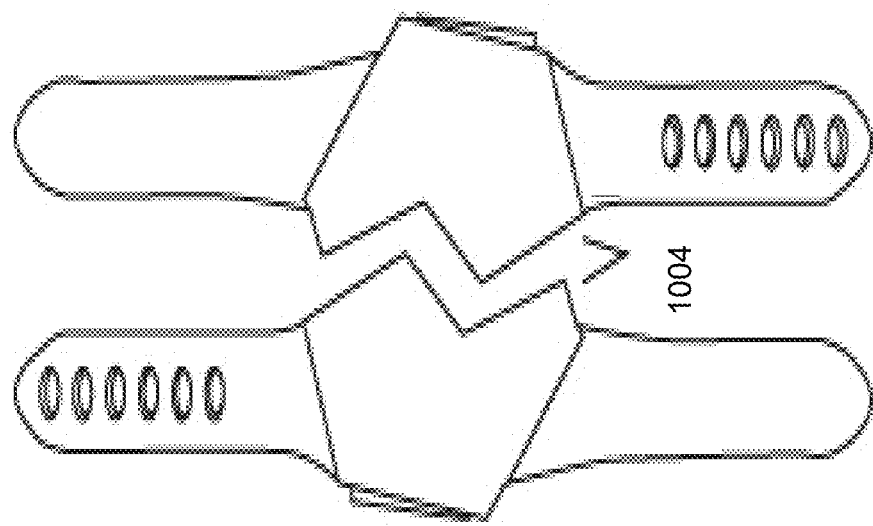
FIG. 10B illustrates a back view of a pair of motion capture bands in an exemplary yin and yang configuration consistent with certain embodiments of the present invention.
Figure 10A:
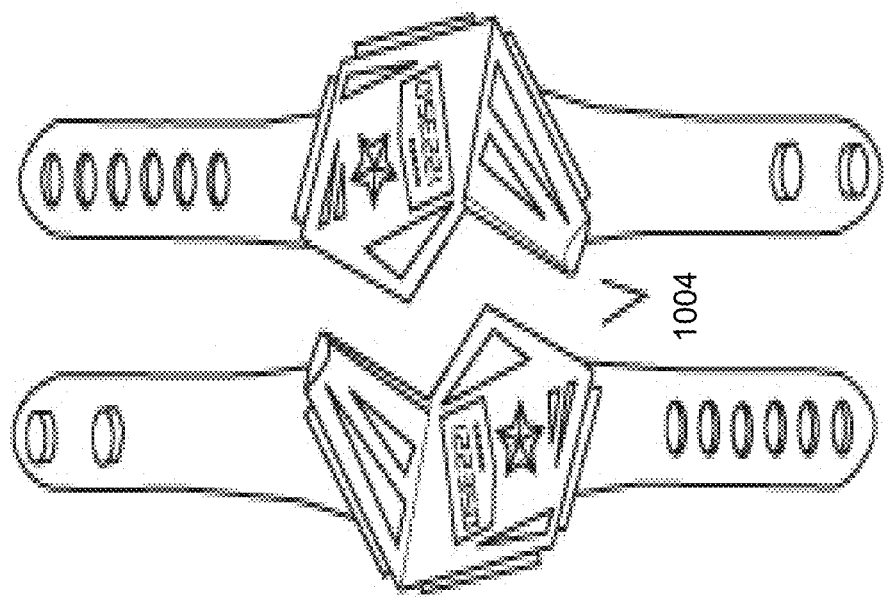
FIG. 10A illustrates a front view of a pair of motion capture bands in an exemplary yin and yang configuration consistent with certain embodiments of the present invention.

FIG. 10A illustrates a front view of a pair of motion capture bands in an exemplary yin and yang configuration consistent with certain embodiments of the present invention. In this exemplary embodiment, the motion capture bands, Atomic Bands, are created in a Yin and Yang configuration such that a first motion capture band of the pair is manufactured in a casing having a Z shaped contour on the right hand side of the casing. The second motion capture band of the pair is manufactured having a Z shaped contour on the left hand side of the casing. As may be seen from FIG. 10A, as the first motion capture band and the second capture band are brought close together, the first motion capture band and the second motion capture band may fit together at the Z shaped contours (1004) when the motion capture bands are placed in contact with one another. It should be understood that this is simply one configuration of the motion capture bands and that other contours and configurations may be contemplated without violating the spirit of the innovation.

FIG. 10B illustrates a back view of a pair of motion capture bands in an exemplary yin and yang configuration consistent with certain embodiments of the present invention. In this exemplary embodiment, once again the Z contour of the right side of the first motion capture band may be shaped so as to fit within the Z contour of the left side of the second motion capture band (1004). This close connection between the first motion capture band and the second motion capture band may facilitate near field communication between the two bands.

FIG. 11A illustrates a view of a pair of motion capture bands separate from a recharging station consistent with certain embodiments of the present invention. In this exemplary embodiment, two motion capture bands (1100) are separate from a charging station stand (1102) and a charging station panel (1104) attached to the charging station stand (1102). In this exemplary embodiment the two motion capture bands (1100) are configured such that when placed in contact with one another, they form a geometric shape that is smaller in dimension than the charging station panel (1104) such that they may fit entirely upon the charging station panel (1104).

FIG. 11B illustrates a view of a pair of motion capture bands being positioned upon a recharging station consistent with certain embodiments of the present invention. In this exemplary embodiment, two motion capture bands (1100) are moved closer to the charging station panel (1104) in preparation for placing the motion capture bands (1100) in contact with the charging station panel (1104).

FIG. 11C illustrates a view of a pair of motion capture bands in contact with a recharging station during a charging action consistent with certain embodiments of the present invention. In this exemplary embodiment, two motion capture bands (1100) have been placed in contact with one another and in contact with the upper surface of the charging station panel (1104) where the motion capture bands (1100) may be recharged by the charging station (1102). The charging station panel (1104) may be configured in any geometric shape to accommodate a pair of motion capture bands (1100) during the recharging process.

Figure 12A:
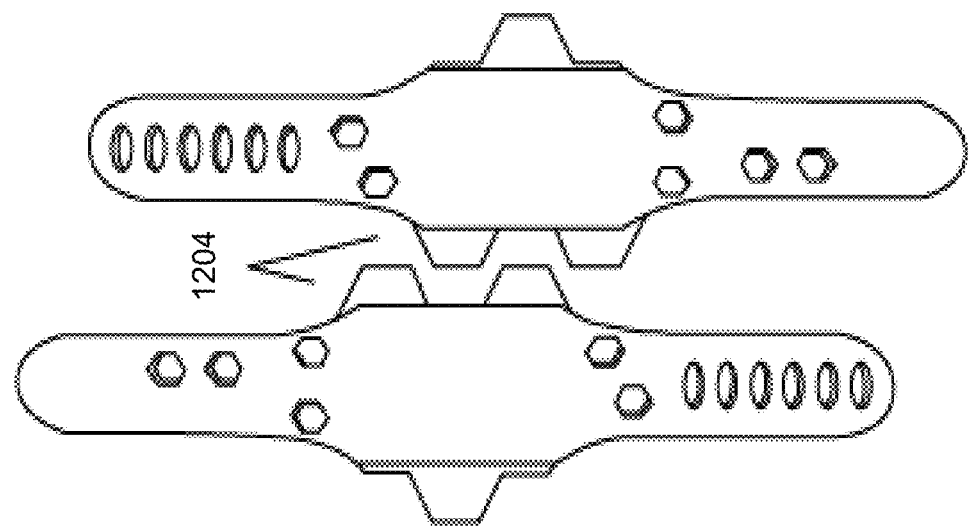
FIG. 12A illustrates a front view of a pair of motion capture bands in an exemplary yin and yang configuration consistent with certain embodiments of the present invention.

FIG. 12A illustrates a front view of a pair of motion capture bands in an exemplary yin and yang configuration consistent with certain embodiments of the present invention. In this alternate exemplary embodiment, the motion capture bands are created in a Yin and Yang configuration composed of interlocking hexagonal shapes such that a first motion capture band of the pair is manufactured in a casing having a concave shaped contour on the right hand side of the casing. The second motion capture band of the pair is manufactured having interlocking hexagonal shapes in a convex shaped contour on the left hand side of the casing. As may be seen from FIG. 12A, as the first motion capture band and the second capture band are brought close together, the first motion capture band and the second motion capture band may fit together at the concave and convex shaped contours (1204) when the motion capture bands are placed in contact with one another. It should be understood that this is simply one configuration of the motion capture bands and that other contours and configurations may be contemplated without violating the spirit of the innovation.

Figure 12B:
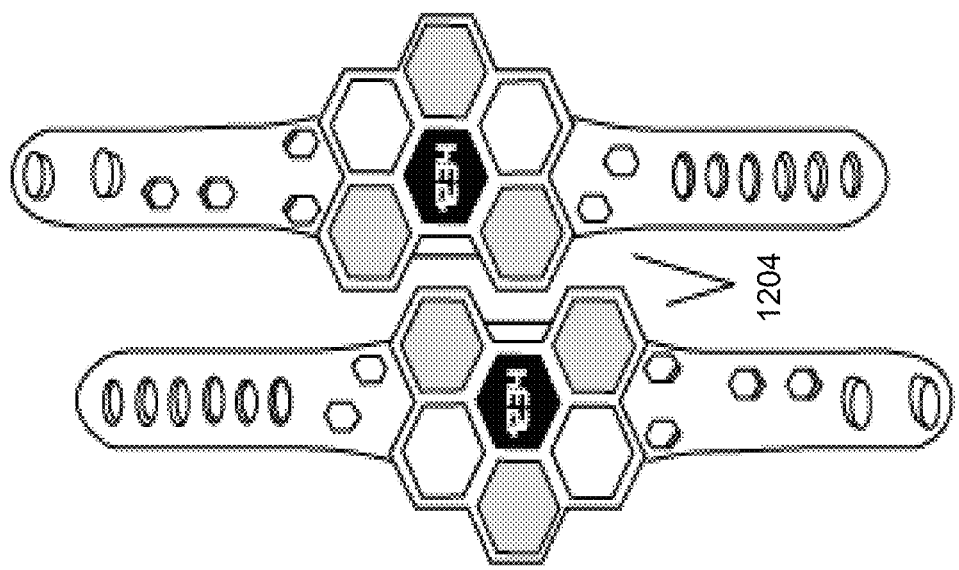
FIG. 12B illustrates a back view of a pair of motion capture bands in an exemplary yin and yang configuration consistent with certain embodiments of the present invention.

FIG. 12B illustrates a back view of a pair of motion capture bands in an exemplary yin and yang configuration consistent with certain embodiments of the present invention. In this alternative exemplary embodiment, once again the concave contour of the right side of the first motion capture band may be shaped so as to fit within the convex contour of the left side of the second motion capture band (1204). This close connection between the first motion capture band and the second motion capture band may facilitate near field communication between the two bands, as well as optimizing the geometry of the motion capture bands during the recharging process.

While certain illustrative embodiments have been described, it is evident that many alternatives, modifications, permutations and variations will become apparent to those skilled in the art in light of the foregoing description.

I claim:

1. A system for motion capture of human activity, comprising: at least one pair of sensing bands capable of being attached to a body;
    each sensing band in said pair of sensing bands in continuous communication with the other sensing band of said pair of sensing bands and the pair positioned such that a first sensing band of said pair of sensing bands is capable of being attached to the right side of said body and the second sensing band of said pair of sensing bands is capable of being attached to the left side of said body;
    each pair of sensing bands being in communication with every other sensing band external to said pair of sensing bands and with an external processor;
    the sensing bands operative to track motion of said body along x, y, and z axes, as well as rotational motion along a transverse plane;
    the sensing bands capturing motion of said body along the x, y, z axes and the transverse plane and transmitting said captured motion to said external processor;
    where data captured from the sensing bands is analyzed by the external processor to create a scoring mechanism to incentivize physical activities; and
    transmitting scoring mechanism results data in real time to one or more human users of the system.

2. The system of claim 1, where said captured data from the sensing bands is analyzed by the external processor to determine direction and level of motion, the part of a human user performing said motion, and duration and dynamic qualities of said motion.

3. The system of claim 1, where the sensing bands may operate in groups larger than two and permit a user to be a part of an augmented reality experience.

4. The system of claim 1, further comprising communication into and out of the sensing bands using one or more communication channels where said one or more communication channels may comprise any of Near Field Communication (NFC), Bluetooth, WiFi, cellular telephone links, and infrared beaming.

5. The system of claim 1, further comprising collection and analysis of motion data from two or more of said sensing bands and an optional front facing camera associated with a mobile device.

6. The system of claim 1, further comprising audible feedback to said one or more human users from said sensing bands.

7. The system of claim 1, further comprising multiple microhammers associated with said sensor bands providing pulse sensations of different frequencies to be delivered to said one or more human users simultaneously.

8. The system of claim 1, where pairs of said sensing bands fit together in an interlocking 'yin yang' configuration.

9. The system of claim 8, where pairs of said sensing bands, utilizing the interlocking configuration, are joined together to be charged on a docking station simultaneously.

10. A method of capturing physical motion data associated with a human activity, comprising;
    positioning at least one pair of sensing bands on a human body;
    each sensing band in said pair of sensing bands in continuous communication with the other sensing band of said pair of sensing bands and the pair positioned such that a first sensing band of said pair of sensing bands is positioned on the right side of said body and the second sensing band of said pair of sensing bands is positioned on the left side of said body;
    establishing data communication between each pair of sensing bands and every other sensing band external to said pair of sensing bands and with an external processor;
    the pair of sensing bands operative to track motion of the human body in any of the x axis, y axis, and/or z axis, as well as rotational motion along a transverse plane;
    the pair of sensing bands capturing data associated with said tracked motion of the human body along said x, y, z axes and the transverse plane and transmitting the captured data as captured tracked motion data to said external processor;
    analyzing the captured tracked motion data by the external processor to create a scoring mechanism to incentivize physical activities.

11. The method of claim 10, where said captured tracked motion data captured by the sensing bands is analyzed by the external processor to determine direction and level of said motion, the part of said body performing said motion, and duration and dynamic qualities of said motion.

12. The method of claim 10, where said sensing bands may operate in groups larger than two and permit data collected from all of said sensing bands to be transmitted to the external processor for analysis in real time.

13. The method of claim 10, further comprising communication into and out of the sensing bands using one or more communication channels where said one or more communication channels may comprise any of Near Field Communication (NFC), Bluetooth, WiFi, cellular telephone links, and infrared beaming.

14. The method of claim 10, further comprising collection and analysis of motion data from two or more of said sensing bands and an optional front facing camera associated with a mobile device.

15. The method of claim 10, further comprising said sensing bands operable to provide audible feedback to one or more human users.

16. The method of claim 10, further comprising multiple microhammers associated with said sensor bands providing pulse sensations of different frequencies to be delivered to said one or more human users simultaneously.

17. The method of claim 10, where pairs of said motion sensing bands fit together in an interlocking 'yin yang' configuration, and where pairs of said motion sensing bands, utilizing the interlocking configuration, are joined together to be charged on a docking station simultaneously.

* * * * *